US012683784B2

(12) United States Patent
Buchanan et al.

(10) Patent No.: US 12,683,784 B2
(45) Date of Patent: Jul. 14, 2026

(54) DATA ANALYSIS SYSTEMS AND METHODS FOR DETECTING ANOMALIES IN TOKENIZED DATASETS

(71) Applicant: BANK OF AMERICA CORPORATION, Charlotte, NC (US)

(72) Inventors: Aaron Lee Buchanan, Mint Hill, NC (US); Saumya Agrawal, Dallas, TX (US); Bryant Coughlin, Green Bay, WI (US); DeAngelo Floyd, Charlotte, NC (US); John Raymond Omernik, Wittenberg, WI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 200 days.

(21) Appl. No.: 18/228,059

(22) Filed: Jul. 31, 2023

(65) Prior Publication Data

US 2025/0047487 A1 Feb. 6, 2025

(51) Int. Cl.
*H04L 9/32* (2006.01)

(52) U.S. Cl.
CPC ................................... *H04L 9/3213* (2013.01)

(58) Field of Classification Search
CPC ....................................................... H04L 9/3213
See application file for complete search history.

(56) References Cited

U.S. PATENT DOCUMENTS

| | | | | |
|---|---|---|---|---|
| 8,051,096 | B1 * | 11/2011 | Elbaz | ...................... G06F 16/35 707/778 |
| 8,892,661 | B2 | 11/2014 | Ramarao et al. | |
| 10,587,629 | B1 | 3/2020 | Kurupati et al. | |
| 10,789,537 | B2 | 9/2020 | Mcqueen et al. | |
| 10,990,970 | B2 | 4/2021 | Divitt | |
| 11,074,586 | B2 | 7/2021 | Vandezande et al. | |
| 11,075,867 | B2 | 7/2021 | Kovega et al. | |

(Continued)

FOREIGN PATENT DOCUMENTS

| | | | | |
|---|---|---|---|---|
| EP | | 3637294 A1 * | 4/2020 | ......... H04L 63/1491 |
| WO | WO-2022231682 A1 * | 11/2022 | .............. H02J 50/80 |

OTHER PUBLICATIONS

Kumar et al, Token Flow Control, 2008 IEEE p. 342-353 (Year: 2008).*

*Primary Examiner* — Abu S Sholeman
(74) *Attorney, Agent, or Firm* — Moore & Van Allen PLLC; Lauren M. Stokes

(57) ABSTRACT

Systems, methods, and computer program products are provided herein for detecting anomalies in tokenized datasets. An example method includes receiving a user input associated with a first account credential that defines a sequence of one or more alphanumeric characters and/or symbols and determining one or more credential characteristics of the sequence defined by the first account credential. The example method also includes determining a first token for the first account credential based on the one or more determined credential characteristics and detecting an anomaly for the first token implicating a validity of the first account credential. The method may further include modifying one or more metadata entries of the first token based on the detected anomaly. The anomaly for the first token may be determined based upon the frequency at which the first token is associated with account credential inputs during a time period.

16 Claims, 7 Drawing Sheets

(56)        References Cited

U.S. PATENT DOCUMENTS

| | | | |
|---|---|---|---|
| 11,463,462 | B2 | 10/2022 | Luo et al. |
| 11,741,480 | B2 | 8/2023 | Kramme et al. |
| 2003/0200199 | A1* | 10/2003 | Snyder .................. G06F 40/284 |
| 2004/0122817 | A1* | 6/2004 | Kaiser ................... G06F 16/904 |
| | | | 707/999.005 |
| 2005/0198070 | A1* | 9/2005 | Lowry .................. G06F 16/316 |
| 2009/0164411 | A1* | 6/2009 | Dasdan ............... G06F 16/9558 |
| | | | 707/999.005 |
| 2014/0040152 | A1 | 2/2014 | Fang et al. |
| 2015/0312242 | A1* | 10/2015 | Ogawa .................. H04L 9/3228 |
| | | | 726/6 |
| 2017/0323092 | A1* | 11/2017 | Thakur ................... G06F 21/36 |
| 2017/0345003 | A1 | 11/2017 | Spears et al. |
| 2019/0174304 | A1* | 6/2019 | Tunnell .............. H04L 63/0838 |
| 2020/0065484 | A1* | 2/2020 | Gordon ................ G06F 21/604 |
| 2020/0065506 | A1* | 2/2020 | Bugadi .............. G06F 21/6209 |
| 2020/0380395 | A1 | 12/2020 | Mcqueen et al. |
| 2021/0004875 | A1* | 1/2021 | Brown ................... G06Q 10/40 |
| 2021/0200955 | A1 | 7/2021 | Ben Kimon et al. |
| 2022/0067703 | A1* | 3/2022 | Sarin ................... G06Q 20/322 |
| 2022/0327108 | A1* | 10/2022 | Manolache ............ G06N 3/084 |
| 2022/0360596 | A1 | 11/2022 | Varnavas et al. |
| 2023/0162117 | A1 | 5/2023 | Sabri |
| 2023/0171087 | A1 | 6/2023 | Cottingham et al. |

* cited by examiner

DETERMINE A FREQUENCY AT WHICH THE FIRST TOKEN IS ASSOCIATED WITH ACCOUNT CREDENTIAL INPUTS DURING A TIME PERIOD
302

DOES THE DETERMINED FREQUENCY SATISFY A PREVALENCE THRESHOLD?
304

NO

YES

DETECT THE ANOMALY FOR THE FIRST TOKEN
306

DETERMINE A SECOND TOKEN FOR THE FIRST ACCOUNT CREDENTIAL BASED ON THE ONE OR MORE DETERMINED CREDENTIAL CHARACTERISTICS
402

DETECT AN ANOMALY FOR THE SECOND TOKEN IMPLICATING A VALIDITY OF THE FIRST ACCOUNT CREDENTIAL
404

MODIFY ONE OR MORE METADATA ENTRIES OF THE SECOND TOKEN BASED ON THE DETECTED ANOMALY
406

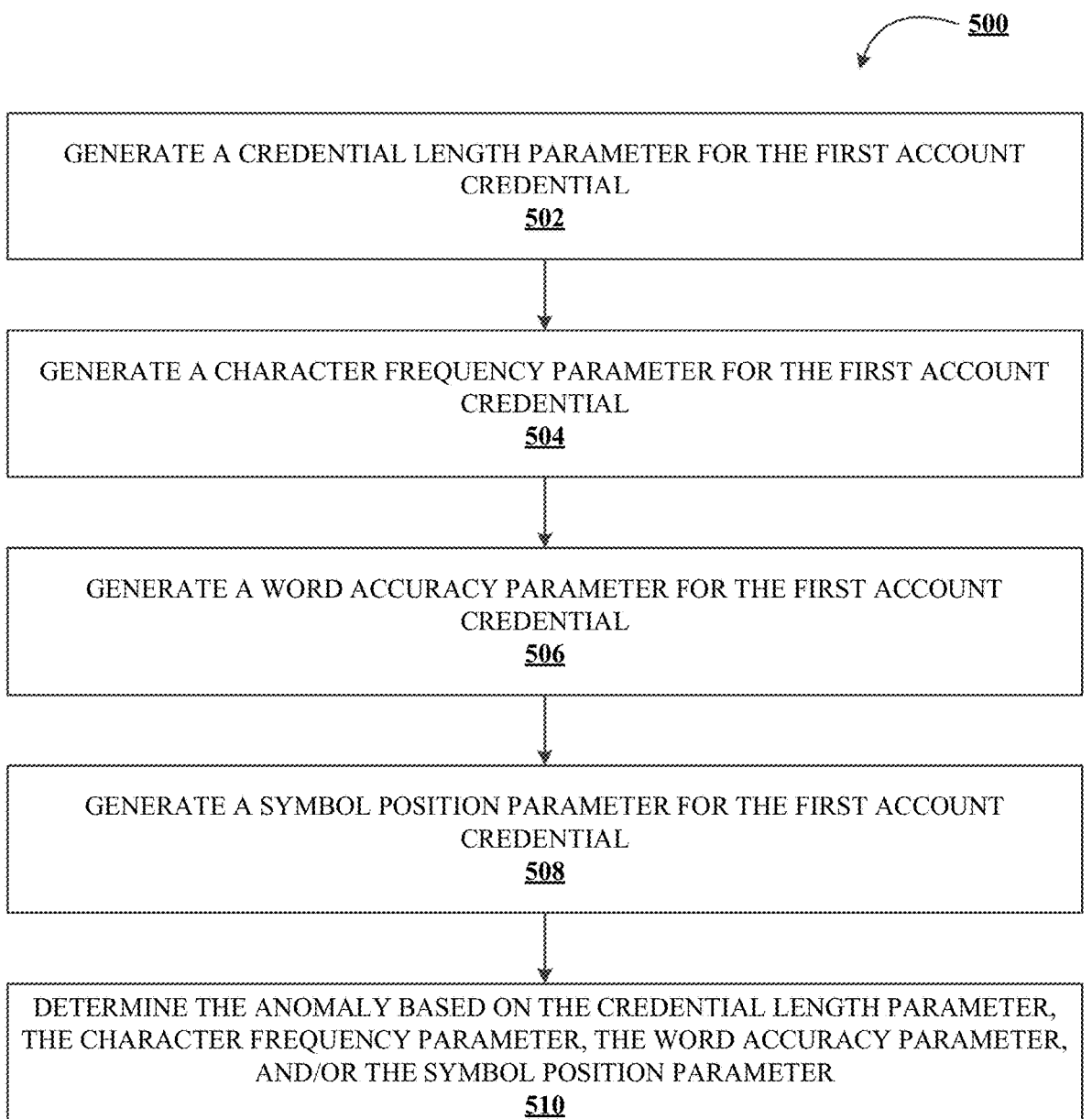

500

GENERATE A CREDENTIAL LENGTH PARAMETER FOR THE FIRST ACCOUNT CREDENTIAL
502

GENERATE A CHARACTER FREQUENCY PARAMETER FOR THE FIRST ACCOUNT CREDENTIAL
504

GENERATE A WORD ACCURACY PARAMETER FOR THE FIRST ACCOUNT CREDENTIAL
506

GENERATE A SYMBOL POSITION PARAMETER FOR THE FIRST ACCOUNT CREDENTIAL
508

DETERMINE THE ANOMALY BASED ON THE CREDENTIAL LENGTH PARAMETER, THE CHARACTER FREQUENCY PARAMETER, THE WORD ACCURACY PARAMETER, AND/OR THE SYMBOL POSITION PARAMETER
510

FIG. 5

DATA ANALYSIS SYSTEMS AND METHODS FOR DETECTING ANOMALIES IN TOKENIZED DATASETS

TECHNOLOGICAL FIELD

Example embodiments of the present disclosure relate generally to credential verification and, more particularly, to systems and methods for detecting anomalies in tokenized datasets.

BACKGROUND

Electronic networks, communication systems, computing devices, and other systems may authenticate or otherwise verify users that interact with these systems. For example, account credentials that are provided by a user may be used to uniquely identify the user to the system as part of such an authentication process. Applicant has identified a number of deficiencies and problems associated with conventional credential verification systems and associated methods. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided herein for detecting anomalies in tokenized datasets. In one aspect, a system for detecting anomalies in tokenized datasets may include at least one non-transitory storage device and at least one processor coupled to the at least one non-transitory storage device. The at least one processor may receive a user input associated with a first account credential where the first account credential defines at least a sequence of one or more alphanumeric characters and/or symbols and determine one or more credential characteristics of the sequence defined by the first account credential. The processor may also determine a first token for the first account credential based on the one or more determined credential characteristics, detect an anomaly for the first token implicating a validity of the first account credential, and modify one or more metadata entries of the first token based on the detected anomaly.

In some embodiments, the first token may be generated based on a plurality of account credential inputs having common credential characteristics.

In some embodiments, the processor may be further configured to, in response to the modification of the one or more metadata entries, preclude access to one or more system applications for the first account credential.

In some embodiments, the processor may be further configured to, in response to the modification of the one or more metadata entries, generate a user notification for presentation to an operator associated with the system.

In some embodiments, in detecting the anomaly for the first token, the processor may be further configured to determine a frequency at which the first token is associated with account credential inputs during a time period and detect the anomaly for the first token in an instance in which the determined frequency satisfies a prevalence threshold.

In some embodiments, the processor may be further configured to determine a second token for the first account credential based on the one or more determined credential characteristics, detect an anomaly for the second token implicating a validity of the first account credential, and modify one or more metadata entries of the second token based on the detected anomaly.

In some embodiments, the processor may be further configured to generate a credential length parameter for the first account credential. In such an embodiment, the anomaly for the first token may be determined at least in part based upon the credential length parameter.

In some further embodiments, the processor may be further configured to generate a character frequency parameter for the first account credential. In such an embodiment, the anomaly for the first token may be determined at least in part based upon the character frequency parameter.

In some further embodiments, the processor may be further configured to generate a word accuracy parameter for the first account credential. In such an embodiment, the anomaly for the first token may be determined at least in part based upon the word accuracy parameter.

In some still further embodiments, the processor may be further configured to generate a symbol position parameter for the first account credential. In such an embodiment, the anomaly for the first token may be determined at least in part based upon the symbol position parameter.

In another aspect, a computer program product for detecting anomalies in tokenized datasets is provided. The computer program product may include a non-transitory computer-readable medium comprising code. The code, when executed, may cause an apparatus to receive a user input associated with a first account credential where the first account credential defines at least a sequence of one or more alphanumeric characters and/or symbols, determine one or more credential characteristics of the sequence defined by the first account credential, determine a first token for the first account credential based on the one or more determined credential characteristics, detect an anomaly for the first token implicating a validity of the first account credential, and modify one or more metadata entries of the first token based on the detected anomaly.

In another aspect, a method for detecting anomalies in tokenized datasets is provided. The method may include receiving a user input associated with a first account credential where the first account credential defines at least a sequence of one or more alphanumeric characters and/or symbols, determining one or more credential characteristics of the sequence defined by the first account credential, determining a first token for the first account credential based on the one or more determined credential characteristics, detecting an anomaly for the first token implicating a validity of the first account credential, and modifying one or more metadata entries of the first token based on the detected anomaly.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 5 illustrates a method for Bayesian-based anomaly determinations in accordance with one or more embodiments of the present disclosure.

DETAILED DESCRIPTION

Figure 1A:
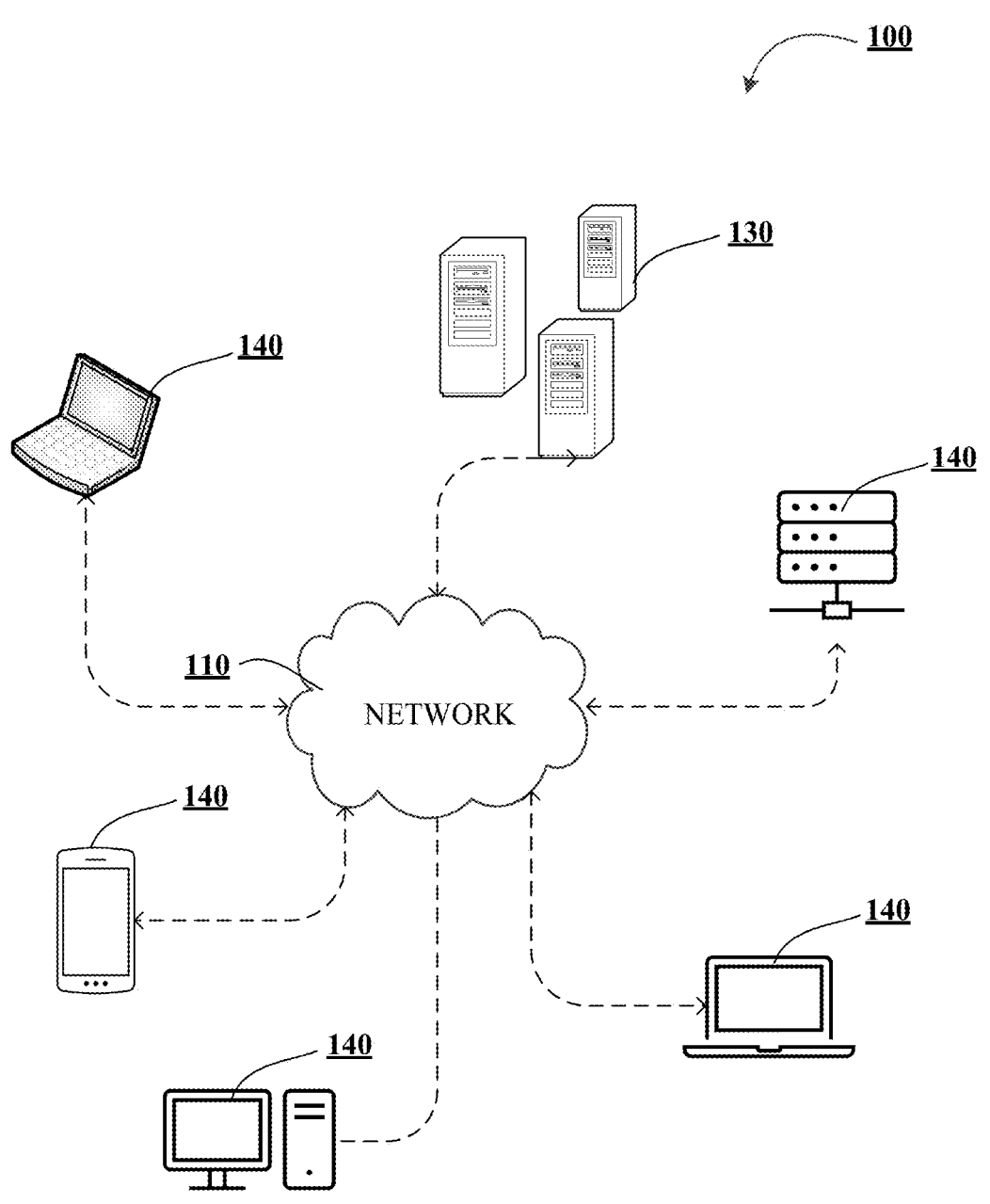
FIGS. 1A-1C illustrate technical components of an exemplary distributed computing environment for detecting anomalies in tokenized datasets in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interact with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. Although described hereinafter with reference to a first user and associated first user device interacting with an example system, the present disclosure contemplates that any number of users and associated user devices may interact with the systems described herein without limitation.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. The present disclosure contemplates that the arrangement, presentation, organization, etc. of the user interfaces described herein may vary based upon the intended application of the system or the like.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, a system and an application, an accessing of stored data by one or more nodes of a computing cluster, a transmission of a requested task, or the like. As described hereinafter, an "interaction" between the system and one or more applications may be permissioned in that the ability for the system (e.g., one or more devices, subsystems, modules, etc.) to access a particular application may be controlled by permissions issued by this application. By way of a non-limiting example, a system of the present disclosure may be configured to ascertain the validity of account credentials received by the system (e.g., as part of a user account creation or otherwise). In such an example, an interaction may refer to the communication or transfer of data from a user device to a system providing account credentials.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, electronic networks, communication systems, computing devices, and other systems may authenticate or otherwise verify users that interact with these systems. For example, account credentials (e.g., usernames, passwords, etc.) that are provided by a user may be used to uniquely identify the user to the system as part of such an authentication process. In some instances, however, account credentials may be provided to an electronic system that are fabricated, fictious, or otherwise unrelated to a valid underlying user. For example, a bad actor or other threat to the system may attempt to leverage fabricated account credentials that appear valid in order to achieve unauthorized access to various applications, resources, and/or the like associated with the system. Traditional credential verification systems, however, often fail to properly distinguish between valid account credentials and invalid account credentials due to the ever-increasing sophistication associated with the fabricated credentials. Furthermore, traditional systems may periodically incorrectly categorize a valid account credential as invalid.

In order to solve these issues and others, embodiments of the present disclosure provide systems and methods for detecting anomalies in tokenized datasets formed of account credentials. An example system may receive a user input associated with a first account credential that defines at least a sequence of one or more alphanumeric characters and/or symbols and determine a first token for the first account credential based on the one or more determined credential characteristics associated with the sequence. This first token may be generated based on a plurality of account credential inputs having common credential characteristics, and the system may detect an anomaly implicating the validity of the received first user account credentials based on the frequency at which the first token is assigned to account credential inputs. This tokenization of the account credentials may operate to group credential inputs for evaluation operations which were historically unavailable and identify potentially fabricated account credentials that traditionally would go undetected. Furthermore, in some embodiments, Bayesian-based statistical evaluations may also be employed to further hone the anomaly detection provided by the systems describe herein.

Example System and Circuitry Components

Figure 1B:
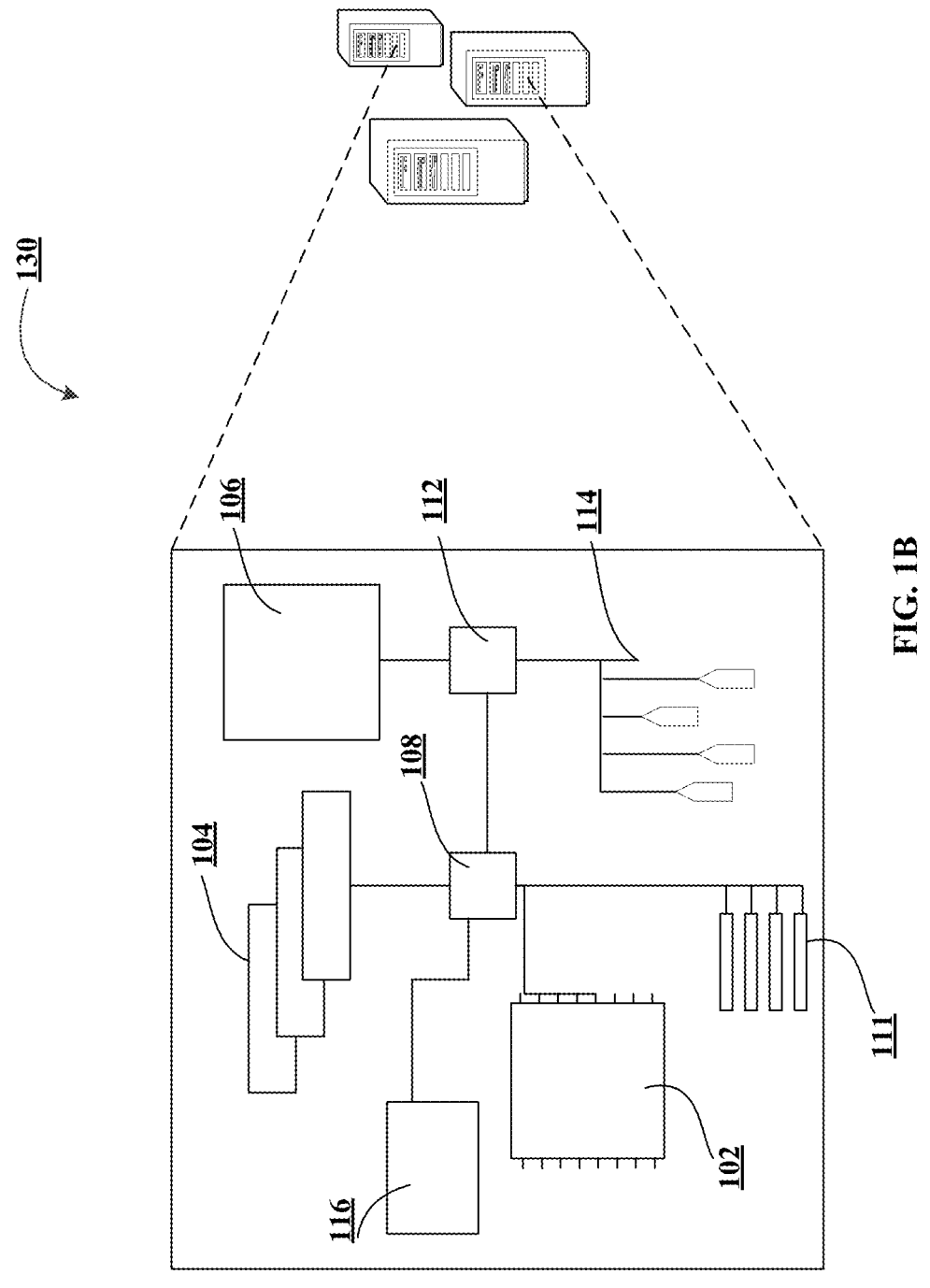
Figure 1C:
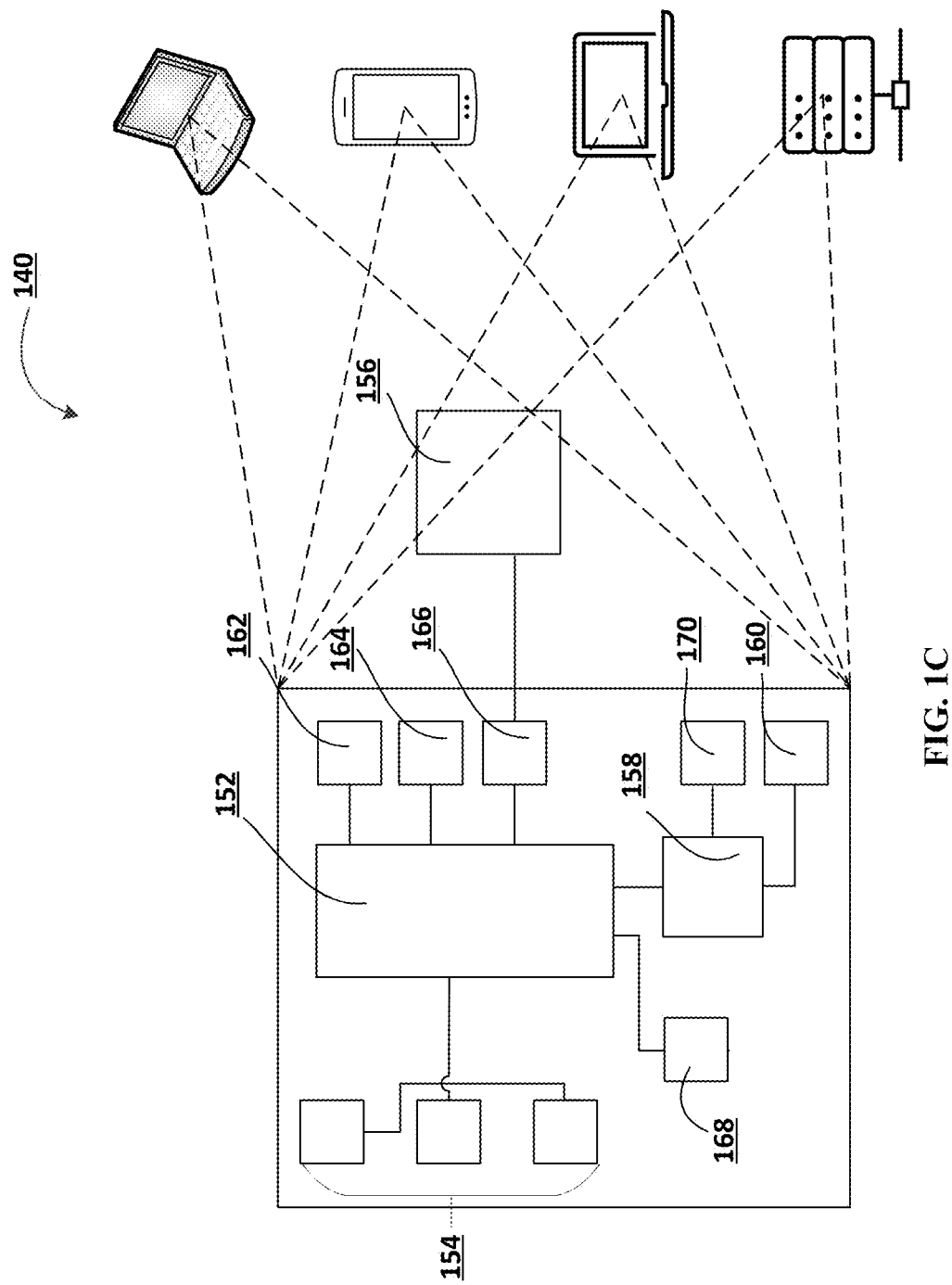

FIGS. 1A-1C illustrate technical components of an exemplary distributed computing environment for detecting anomalies in tokenized datasets 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, virtual reality devices, augmented reality device, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, virtual reality devices, augmented reality device, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and/or a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, virtual reality environments, and/or any of the components described herein. To this end, the system 130 may trigger an authentication subsystem that may require the user (or process) to provide authentication credentials to determine whether the user (or process) is eligible to access the protected resources. As described hereinafter, the embodiments, of the present disclosure may evaluate tokenized datasets formed at least in part by account credentials. As such, once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, VR/AR devices, and/or a speaker. Similarly, in instances in which the account credentials are determined to be fabricated or otherwise invalid, the authentication subsystem precludes access to the user (or process).

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Example Methods for Detecting Anomalies in Tokenized Datasets

Figure 2:
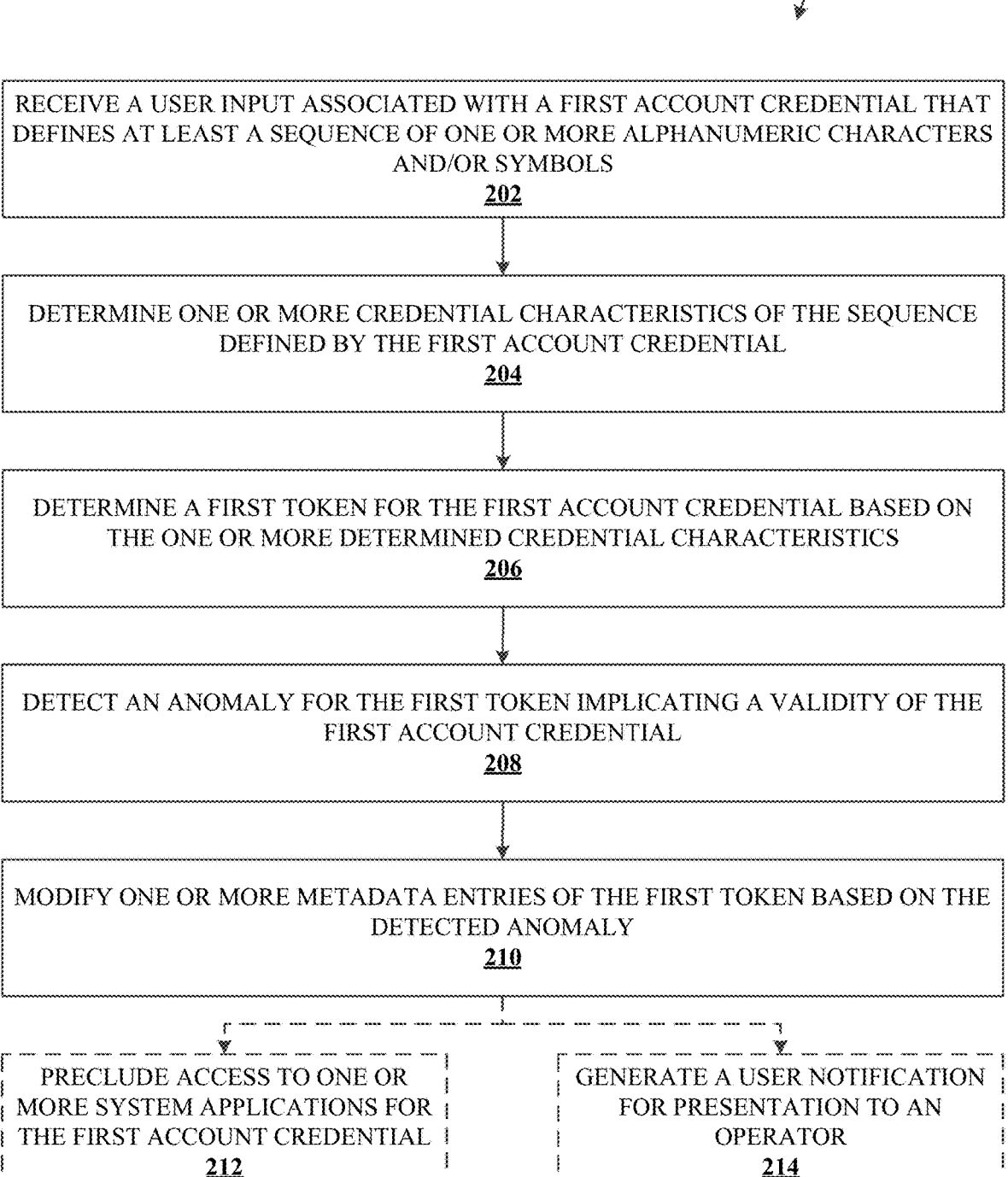
FIG. 2 illustrates a method for detecting anomalies in tokenized datasets in accordance with one or more embodiments of the present disclosure.

FIG. 2 illustrates a flowchart containing a series of operations for detecting anomalies in tokenized datasets (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 202, the system 130 may be configured to receive a user input associated with a first account credential. As described above, the system 130 of the present application may be configured to authenticate interactions between the system 130 and associated users intending to interact with the system 130. In some embodiments, the request received at operation 202 may be received from a first user device associated with the first user. For example, a first user may, via a user interface presented on the first user device, transmit a request to interact with the system 130. As part of this request, the first user may be required to provide first account credentials that may be used to uniquely identify the first user to the system 130. By way of a non-limiting example, the first user may provide a username (e.g. example first account credential) that uniquely identifies the first user to the system 130.

The first account credential may define at least a sequence of one or more alphanumeric characters and/or symbols that are used to uniquely identify the first user to the system 130. As would be evident to one of ordinary skill in the art in light of the present disclosure, a username (e.g., example first account credential) for the first user may be selected by the first user from amongst a plurality of alphanumeric characters (e.g., letters, numbers, etc.) and/or symbols that are used in computing systems. The first user may, for example, select a plurality of letters, numbers, and/or symbols in a particular arrangement or configuration to serve as the username (e.g., example first account credential) of the first user. In some instances, the system 130 may define one or more rules that at least partially limit the first account credential of the first user. By way of example, the system 130 may include rules that require a minimum length (e.g., a total number of selected characters), maximum length, minimum number of letters, minimum number of numbers, minimum number of symbols, and/or the like that at least partially implicate the composition of the first account credential selected (e.g., input) by the first user. The present disclosure contemplates that the system 130 may define any number of rules that implicate the first account credential based upon the intended application of the system 130.

Thereafter, as shown in operation 204, the system 130 may be configured to determine one or more credential characteristics of the sequence defined by the first account credential. As described above, the first account credential of the first user received at operation 202 may define a sequence of alphanumeric characters and/or symbols. The sequence of these alphanumeric characters and/or symbols may further refer to the particular arrangement, ordering, positioning, etc. of the characters and/or symbols so as to form the first account credential (e.g., the example username of the first user). The selection of particular alphanumeric characters and/or symbols, the number of characters and/or symbols, the arrangement of these characters and/or symbols, one or more patterns associated with these selections and/or arrangements, and/or the like may be referred to herein as one or more credential characteristics of the sequence. By way of example, the system 130 may determine that the sequence of one or more alphanumeric characters and/or symbols defining the first account credential includes a particular pattern (e.g., two (2) letters, followed by one (1) number, followed by three (3) letters, etc.). By way of an additional non-limiting example, the system 130 may determine that the sequence of one or more alphanumeric characters and/or symbols defining the first account credential includes a particular collection of letters (e.g., a word, acronym, and/or the like) at a particular position within the sequence. Although described herein with reference to an example pattern, collection of letters, and/or the like, the present disclosure contemplates that the credential characteristics may refer to any parameter, attribute, aspect, quality, feature, and/or the like associated with the first account credential.

Thereafter, as shown in operation 206, the system 130 may be configured to determine a first token for the first account credential based on the one or more determined credential characteristics. As would be evident to one of ordinary skill in the art in light of the present disclosure, a first token as described herein may refer to an electronic resource or digital artifact generated to facilitate the identification, authentication, or authorization of account credentials associated with a user or system. A token may be a unique, alphanumeric representation that may be utilized in lieu of the original account credentials for various operations, such as user identification, access control, or account management. The first token described herein may be generated based on a plurality of account credential inputs having common credential characteristics. As described above with reference to operation 204, the system 130 may determine one or more credential characteristics for the first account credential, such as a pattern, particular collection of letters, etc. defined by the sequence of the first account credential, and these determined credential characteristics may be used to group, via the token determinations described herein, the first account credential.

By way of example, the system 130 may receive or otherwise have access to a plurality of account credentials associated with respective users that may, for example, be stored in a database or other repository. The system 130 may, in response to receiving these account credentials, determine various credential characteristics for the account credentials and generate tokens for grouping account credentials having common credential characteristics. At operation 206, the system 130 may determine a first token for the first account credential and assign the first account credential to the first token in an instance in which the credential characteristics of the first account credential match or are substantially similar to the credential characteristics associated with the first token. By way of continued example, the system 130 may determine that the credential characteristics of the first account credential are indicative of a first pattern (e.g., two (2) letters, followed by one (1) number, followed by three (3) letters, etc.). The system 130 may identify that the first token is associated with other account credentials having the same or substantially the same first pattern and determine the first token for the first account credential. By way of an additional example, the system 130 may determine that the credential characteristics of the first account credential are indicative of a particular collection of letters (e.g., a word or the like) at a particular position (e.g., centrally located or the like) within the sequence. The system 130 may identify that the first token is associated with other account credentials having the same or substantially the same collection of letters at the same or substantially the same position and determine the first token for the first account credential.

Thereafter, as shown in operation 208, the system 130 may be configured to detect an anomaly for the first token implicating a validity of the first account credential. As described above, in some instances, a bad actor or other threat to the system 130 may supply fabricated or fictitious account credentials to the system 130. In order to detect account credentials (e.g., the example first account credential) that may be fabricated or fictitious, the system 130 may detect an anomaly associated with particular tokens. By way of example and as described hereafter with reference to FIG. 3, the system 130 may employ a frequency determination for the first token that may be implicate a validity of the first account credential. The system 130, for example, may determine a frequency at which the first token is associated with account credential inputs during a time period (e.g., week, month, year, etc.) and detect an anomaly (e.g., the potential for fabricated or fictitious account credentials) when a plurality of account credentials received by the system 130 during the time period are assigned the same token (e.g., the first token). By way of a particular, non-limiting example, the system 130 may receive a plurality of account credential inputs during a day (e.g., determined time period) that are each assigned to the first token for having the same pattern (e.g., a common credential characteristic). If the number of account credentials having this first token exceeds a threshold frequency (e.g., a prevalence threshold), the system 130 may detect an anomaly for the first token.

In other embodiments, as described hereafter with reference to FIG. 5, the system 130 may leverage one or more Bayesian-based techniques for detecting anomalies. For example, the system 130 may determine various parameters associated with the first account credential, such as the frequency at which a character is used, the use of particular words within the account credential, the position of symbols, if any, with respect to the sequence of the account credential, and/or the length of the account credential to determine a probability (e.g., confidence or the like) that the first account credential is valid. As described hereafter, the Bayesian-based techniques of the present disclosure may leverage any statistical inference associated with any credential characteristic based upon the intended application of the system 130 and may further be iteratively updated as additional evidence or information (e.g., additional account credential inputs or the like) are received.

Thereafter, as shown in operation 210, the system 130 may be configured to modify one or more metadata entries of the first token based on the detected anomaly. For example, the tokens (e.g., digital artifacts, electronic resources, etc.) described herein may include various data and metadata entries that define interactions with the token, how the token is reviewed by the system 130, how access is permissioned to user account credentials associated with the token, and/or the like. As such, the metadata modifications of operation 210 may operate to modify how the system 130 interacts with the user accounts implicated by the anomaly detected for the associated first token. For example, in some embodiments as shown in operation 212, the system 130 may be configured to preclude access to one or more system applications for the first account credential. The system 130 may, as described above, permission access to various applications associated with the system 130. When an anomaly is detected that may be indicative of fabricated or fictitious account credentials for the first token, the system 130 may, in some embodiments, preclude access to one or more applications for account credentials (e.g., at least the first account credential) associated with the first token. Additionally or alternatively, in some embodiments, the system 130 may be configured to generate a user notification for presentation to an operator associated with the system 130 as shown in operation 214. For example, an operator or other user associated with the system 130 may receive an indication of a potential anomaly for the first token and review the anomaly before precluding application access.

Figure 3:
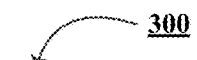
FIG. 3 illustrates a method for frequency-based anomaly determinations in accordance with one or more embodiments of the present disclosure.
Figure 3:
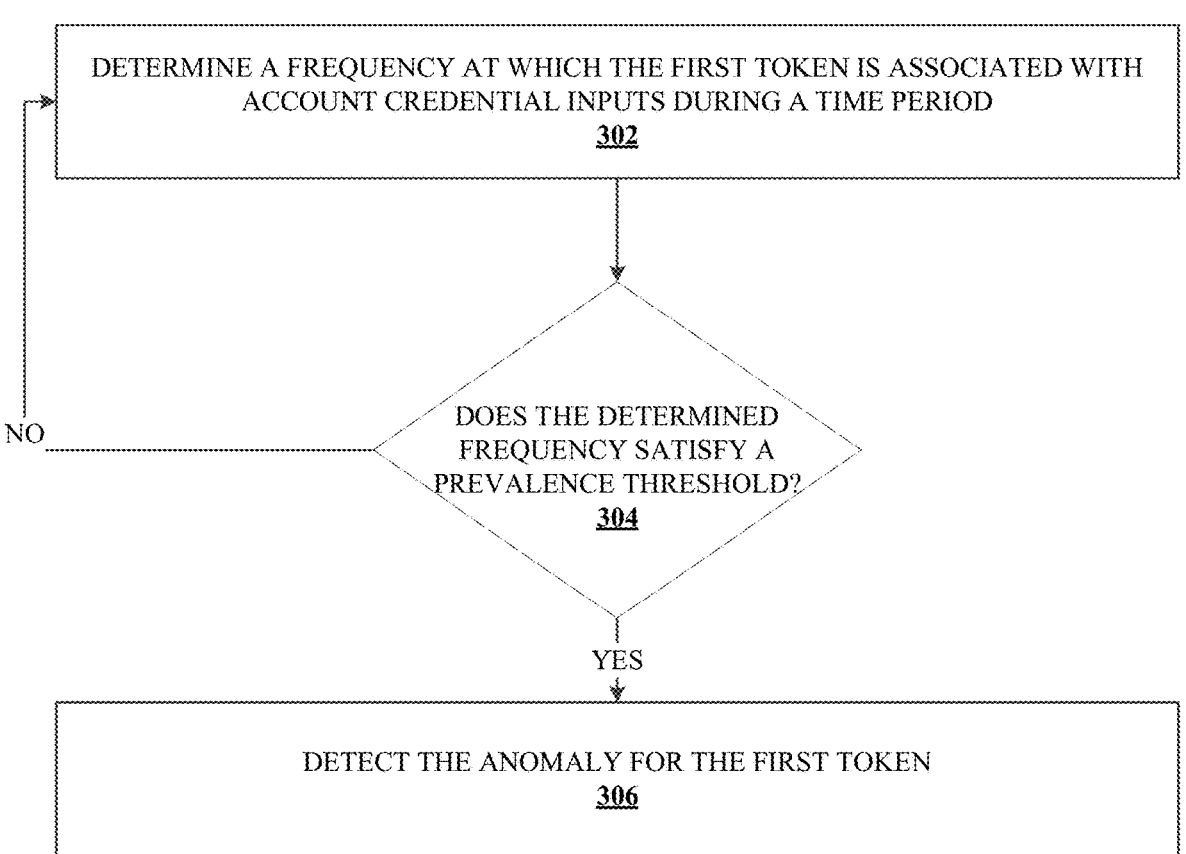

FIG. 3 illustrates a flowchart containing a series of operations for frequency-based anomaly determinations (e.g., method 300). The operations illustrated in FIG. 3 may, for example, be performed by, with the assistance of, and/or under the control of an apparatus (e.g., system 130, endpoint devices 140, etc.), as described above. In this regard, performance of the operations may invoke one or more of the components described above with reference to FIGS. 1A-1C (e.g., processor 102, processor 152, etc.).

As shown in operation 302, in some embodiments, the system 130 may be configured to determine a frequency at which the first token is associated with account credential inputs during a time period. As described above, the system 130 may employ a frequency determination for the first token that may be implicate a validity of the first account credential. The system 130, for example, may determine a frequency at which the first token is associated with account credential inputs during a time period (e.g., week, month, year, etc.) and detect an anomaly (e.g., the potential for fabricated or fictitious account credentials) when a plurality of account credentials received by the system 130 during the time period are assigned the same token (e.g., the first token). By way of a particular, non-limiting example, the system 130 may receive a plurality of account credential inputs during a day (e.g., determined time period) that are each assigned to the first token for having the same pattern (e.g., a common credential characteristic), for having a particular arrangement of characters, and/or the like. The present disclosure contemplates that the system 130 may leverage a time period of any duration in the frequency determinations of FIG. 3 based on the intended application of the system 130.

Furthermore, the time period of FIG. 3 may refer to a number of received account credentials regardless of the time at which the account credentials are received. For example, the system 130 may determine a frequency at which the first token is associated with account credential inputs as a percentage of the total number of account credential inputs (e.g., a percentage of account credentials associated with the first token for all account credential inputs). The present disclosure contemplates that the frequency determination of operation 302 may leverage any frequency determination technique, parameter, assessment, mechanism, and/or the like based on the intended application of the system 130.

Thereafter, as shown in operations 304 and 306, the system may detect the anomaly for the first token in an instance in which the determined frequency satisfies a prevalence threshold. By way of example, the system 130 may implement various prevalence thresholds that refer to a frequency at which the system 130 determines that an anomaly (e.g., potential fabricated or fictious account credentials) may be present. As would be evident to one of ordinary skill in the art in light of the present disclosure, the system 130 may determine that an increased frequency of a particular token (e.g., the first token) may be indicative of a bad actor or threat providing fabricated or fictitious account credentials, particularly in instances in which the frequency is recent in time. By way of a non-limiting example, the system 130 may define a prevalence threshold of ten (10) determination per hour, such that an anomaly may be detected for the first token in an instance in which the first token is assigned to greater than ten (10) account credential inputs in an hour. The present disclosure contemplates that the time period and frequency (e.g., number of account credential associations) for the prevalence threshold may vary based upon the intended application of the system 130 and may further dynamically vary during performance of the operations of FIGS. 2-3.

Figure 4:
FIG. 4 illustrates a method for multi-token anomaly determinations in accordance with one or more embodiments of the present disclosure.

FIG. 4 illustrates a flowchart containing a series of operations for multi-token anomaly determinations (e.g., method 400). The operations illustrated in FIG. 4 may, for example, be performed by, with the assistance of, and/or under the control of an apparatus (e.g., system 130, endpoint devices 140, etc.), as described above. In this regard, performance of the operations may invoke one or more of the components described above with reference to FIGS. 1A-1C (e.g., processor 102, processor 152, etc.).

As shown in operation 402, in some embodiments, the system 130 may be configured to determine a second token for the first account credential based on the one or more determined credential characteristics. As would be evident to one of ordinary skill in the art in light of the present disclosure, the first account credential may be associated with a plurality of tokens based upon the particular credential characteristics associated with the first account credential. By way of continued example, the first token described above with reference to FIG. 2 may be associated with a particular pattern of the sequence of one or more alphanumeric characters and/or symbols defining the first account credential. The second token, however, may be associated with a particular selection of characters (e.g., a word or the like) at a particular position (e.g., centrally located or the like) within the sequence. In such an example, the system 130 may operate similar to operation 206 above and determine a second token for the first account credential and assign the first account credential to the second token in an instance in which the credential characteristics of the first account credential match or are substantially similar to the credential characteristics associated with the second token.

Thereafter, as shown in operations 404 and 406, the system 130 may be configured to detect an anomaly for the second token implicating a validity of the first account credential and modify one or more metadata entries of the second token based on the detected anomaly, respectively. Similar to operations 208 and 210 above, the system 130, for example, may determine a frequency at which the second token is associated with account credential inputs during a time period (e.g., week, month, year, etc.) and detect an anomaly (e.g., the potential for fabricated or fictitious account credentials) when a plurality of account credentials received by the system 130 during the time period are assigned the same token (e.g., the second token). Additionally or alternatively, the system 130 may leverage one or more Bayesian-based techniques for detecting anomalies as described hereafter with reference to FIG. 5. At operation 406, the second token (e.g., digital artifacts, electronic resources, etc.) described herein may include various data and metadata entries that define interactions with the second token, how the second token is reviewed by the system 130, how access is permissioned to user account credentials associated with the second token, and/or the like. For example, the modification at operation 406 may operate to preclude access to one or more system applications for the first account credential associated with the second token.

FIG. 5 illustrates a flowchart containing a series of operations Bayesian-based anomaly determinations (e.g., method 500). The operations illustrated in FIG. 5 may, for example, be performed by, with the assistance of, and/or under the control of an apparatus (e.g., system 130, endpoint devices 140, etc.), as described above. In this regard, performance of the operations may invoke one or more of the components described above with reference to FIGS. 1A-1C (e.g., processor 102, processor 152, etc.).

As described above, the system 130 may leverage one or more Bayesian-based techniques for detecting anomalies. As would be evident to one of ordinary skill in the art in light of the present disclosure, the Bayesian-based techniques described hereinafter may leverage any statistical inference associated with any credential characteristic based upon the intended application of the system 130 and may further be iteratively updated as additional evidence or information (e.g., additional account credential inputs or the like) are received. These Bayesian-based techniques may refer to any determination that is the calculation of outcomes based on the probabilities of independent variables. To this end, the system 130 may, via accessing a database or other repository, generate Bayesian models based upon all of the account credentials available to the system 130 with which the first account credential may be compared to indicate a likelihood of validity associated with the first account credential.

As shown in operation 502, in some embodiments, the system 130 may be configured to generate a credential length parameter for the first account credential. The credential length parameter for the first account credential may be, for example, indicative of the probability of the first account credential having a defined length. By way of a non-limiting example, the system 130 may take the length of the sequence of alphanumeric characters and/or symbols defined by the first account credential and compare this length with the average or most common length probability of all account credentials accessed by the system 130. In some instances, this comparison may refer to the division of the length for the first account credential by the most common length probability. The present disclosure contemplates that the credential length parameter may be indicative of any credential length comparison based upon the intended application of the system 130.

As shown in operation 504, in some embodiments, the system 130 may be configured to generate a character frequency parameter for the first account credential. The character frequency parameter for the first account credential may be, for example, indicative of the probability of the first account credential having one or more repeated alphanumeric characters and/or symbols. By way of a non-limiting example, the system 130 may determine all instances of account credentials having repeated alphanumeric characters or symbols (e.g., two (2) repeated characters, three (3) repeated characters, etc.) and normalize these probabilities. In instances in which the first account credential does not include repeated alphanumeric characters or symbols, the character frequency parameter may be set to one (1) by the system 130. The present disclosure contemplates that the character frequency parameter may be indicative of any repeated character comparison based upon the intended application of the system 130.

As shown in operation 506, in some embodiments, the system 130 may be configured to generate a word accuracy parameter for the first account credential. The word accuracy parameter for the first account credential may be, for example, indicative of the probability of the first account credential having a collection of alphanumeric characters that form a word (e.g., as defined by an applicable dictionary or the like). By way of a non-limiting example, the system 130 may determine all instances of account credentials having alphanumeric characters that form a word and output the probability the first account credential contains a word and the probability that the first account credential does not include a word, respectively. The present disclosure contemplates that the word accuracy parameter may be indicative of the presence of any word or collection of words based upon the intended application of the system 130.

As shown in operation 508, in some embodiments, the system 130 may be configured to generate a symbol position parameter for the first account credential. The symbol position parameter for the first account credential may be, for example, indicative of the probability of the first account credential having a symbol at the front of the sequence, the middle of the sequence, and/or the end of the sequence, defining the first account credential. By way of a non-limiting example, the system 130 may identify all account credentials having a symbol at the front of the sequence, the middle of the sequence, and/or the end of the sequence and normalize each of these probabilities. The present disclosure contemplates that the symbol position parameter may be indicative of the presence of any symbol and its associated position within the sequence based upon the intended application of the system 130.

Thereafter, as shown in operation 510, in some embodiments, the system 130 may be configured to determine the anomaly based on the credential length parameter, the character frequency parameter, the word accuracy parameter, and/or the symbol position parameter. By way of continued example, each parameter generated in operations 502-508 may refer to particular probabilities that may be combined to indicate the final probability that the first account credential is valid. By way of a non-liming example, each of the probabilities defined by the credential length parameter, the character frequency parameter, the word accuracy parameter, and/or the symbol position parameter may be multiplied to determine a final probability.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for detecting anomalies in tokenized datasets, the system comprising:

at least one non-transitory storage device; and at least one processor coupled to the at least one non-transitory storage device, wherein the at least one processor is configured to:

receive a user input associated with a first account credential, wherein the first account credential defines at least a sequence of one or more alphanumeric characters and/or symbols;

determine one or more credential characteristics of the sequence defined by the first account credential, wherein the one or more credential characteristics of the sequence defined by the first account credential define a pattern for the alphanumeric characters and/or symbols of the first account credential;

determine a first token for the first account credential based on the one or more determined credential characteristics, wherein the determined first token is associated with a first pattern of alphanumeric characters and/or symbols that is generated based on one or more account credentials other than the first account credential;

generate a credential length parameter for the first account credential;

generate a character frequency parameter for the first account credential indicative of a probability of the first account credential having one or more repeated alphanumeric characters and/or symbols;

detect an anomaly for the first token implicating a validity of the first account credential, wherein the anomaly for the first token is determined in an instance in which the credential length parameter of the first account credential exceeds a common length probability associated with the first token and in an instance in which the character frequency parameter of the first account credential exceeds a probability of repeated alphanumeric characters and/or symbols associated with the first token;

modify one or more metadata entries of the first token based on the detected anomaly; and preclude access to one or more system applications for the first account credential.

2. The system of claim 1, wherein the processor is further configured to, in response to the modification of the one or more metadata entries, generate a user notification for presentation to an operator associated with the system.

3. The system of claim 1, wherein, in detecting the anomaly for the first token, the processor is further configured to:

determine a frequency at which the first token is associated with account credential inputs during a time period; and detect the anomaly for the first token in an instance in which the determined frequency satisfies a prevalence threshold.

4. The system of claim 1, wherein the processor is further configured to:

determine a second token different from the first token for the first account credential based on the one or more determined credential characteristics;

detect an anomaly for the second token implicating a validity of the first account credential; and modify one or more metadata entries of the second token based on the detected anomaly.

5. The system of claim 1, wherein the processor is further configured to generate a word accuracy parameter for the first account credential, and wherein the anomaly for the first token is determined at least in part based upon the word accuracy parameter.

6. The system of claim 5, wherein the processor is further configured to generate a symbol position parameter for the first account credential, and wherein the anomaly for the first token is determined at least in part based upon the symbol position parameter.

7. A computer program product for detecting anomalies in tokenized datasets, the computer program product comprising a non-transitory computer-readable medium comprising code that, when executed, causes an apparatus to:

receive a user input associated with a first account credential, wherein the first account credential defines at least a sequence of one or more alphanumeric characters and/or symbols;

determine one or more credential characteristics of the sequence defined by the first account credential, wherein the one or more credential characteristics of the sequence defined by the first account credential define a pattern for the alphanumeric characters and/or symbols of the first account credential;

determine a first token for associated with the first account credential based on the one or more determined credential characteristics, wherein the determined first token is associated with a first pattern of alphanumeric characters and/or symbols that is generated based on one or more account credentials other than the first account credential;

generate a credential length parameter for the first account credential;

generate a character frequency parameter for the first account credential indicative of a probability of the first account credential having one or more repeated alphanumeric characters and/or symbols;

detect an anomaly for the first token implicating a validity of the first account credential, wherein the anomaly for the first token is determined in an instance in which the credential length parameter of the first account credential exceeds a common length probability associated with the first token and in an instance in which the character frequency parameter of the first account credential exceeds a probability of repeated alphanumeric characters and/or symbols associated with the first token;

modify one or more metadata entries of the first token based on the detected anomaly; and preclude access to one or more system applications for the first account credential.

8. The computer program product of claim 7, further comprising code that, when executed, causes the apparatus to:

determine a frequency at which the first token is associated with account credential inputs during a time period; and detect the anomaly for the first token in an instance in which the determined frequency satisfies a prevalence threshold.

9. The computer program product of claim 7, further comprising code that, when executed, causes the apparatus to:

determine a second token different from the first token for the first account credential based on the one or more determined credential characteristics;

detect an anomaly for the second token implicating a validity of the first account credential; and modify one or more metadata entries of the second token based on the detected anomaly.

10. The computer program product of claim 7, further comprising code that, when executed, causes the apparatus to generate a character frequency parameter for the first account credential indicative of a probability of the first account credential having one or more repeated alphanumeric characters and/or symbols, and wherein the anomaly for the first token is determined in an instance in which the character frequency parameter of the first account credential exceeds a probability of repeated alphanumeric characters and/or symbols associated with the first token.

11. The computer program product of claim 7, further comprising code that, when executed, causes the apparatus to generate a word accuracy parameter for the first account credential, and wherein the anomaly for the first token is determined at least in part based upon the word accuracy parameter.

12. A method for detecting anomalies in tokenized datasets, the method comprising:

receiving a user input associated with a first account credential, wherein the first account credential defines at least a sequence of one or more alphanumeric characters and/or symbols;

determining one or more credential characteristics of the sequence defined by the first account credential, wherein the one or more credential characteristics of the sequence defined by the first account credential define a pattern for the alphanumeric characters and/or symbols of the first account credential;

determining a first token for the first account credential based on the one or more determined credential characteristics, wherein the determined first token is associated with a first pattern of alphanumeric characters and/or symbols that is generated based on one or more account credentials other than the first account credential;

generating a credential length parameter for the first account credential;

generating a character frequency parameter for the first account credential indicative of a probability of the first account credential having one or more repeated alphanumeric characters and/or symbols;

detecting an anomaly for the first token implicating a validity of the first account credential, wherein the anomaly for the first token is determined in an instance in which the credential length parameter of the first account credential exceeds a common length probability associated with the first token and in an instance in which the character frequency parameter of the first account credential exceeds a probability of repeated alphanumeric characters and/or symbols associated with the first token; and modifying one or more metadata entries of the first token based on the detected anomaly; and precluding access to one or more system applications for the first account credential.

13. The method of claim 12, further comprising:

determining a frequency at which the first token is associated with account credential inputs during a time period; and detecting the anomaly for the first token in an instance in which the determined frequency satisfies a prevalence threshold.

14. The method of claim 12, further comprising:

determining a second token different from the first token for the first account credential based on the one or more determined credential characteristics;

detecting an anomaly for the second token implicating a validity of the first account credential; and modifying one or more metadata entries of the second token based on the detected anomaly.

15. The method of claim 12, further comprising generating a credential length parameter for the first account credential, and wherein the anomaly for the first token is determined in an instance in which the credential length parameter of the first account credential exceeds a common length probability associated with the first token.

16. The method of claim 12, further comprising generating a word accuracy parameter for the first account credential, and wherein the anomaly for the first token is determined at least in part based upon the word accuracy parameter.

* * * * *